Sept. 23, 1969 ATSUSHI ASADA ET AL 3,469,085

REGISTER CONTROLLING SYSTEM

Filed May 12, 1966 2 Sheets-Sheet 1

INVENTORS
ATSUSHI ASADA
ISAMU WASHIZUKA
BY
[signature]
ATTORNEY

Sept. 23, 1969 ATSUSHI ASADA ET AL 3,469,085

REGISTER CONTROLLING SYSTEM

Filed May 12, 1966 2 Sheets-Sheet 2

INVENTORS
ATSUSHI ASADA
ISAMU WASHIZUKA
BY
ATTORNEY

United States Patent Office 3,469,085
Patented Sept. 23, 1969

3,469,085

REGISTER CONTROLLING SYSTEM

Atsushi Asada and Isamu Washizuka, Osaka-shi, Japan, assignors to Hayakawa Denki Kogyo Kabushiki Kaisha, Osaka, Japan, a company of Japan Filed May 12, 1966, Ser. No. 549,580
Claims priority, application Japan, May 24, 1965, 40/30,727
Int. Cl. G11c *19/00*
U.S. Cl. 235—153 7 Claims

ABSTRACT OF THE DISCLOSURE

A register and control system therefor wherein at least two sets of binary coded decimal numbers each consisting of at least one digit is fed into the register with the sets of decimal numbers being separated by a boundary code so that when the information is fed from the register, a judging signal will be produced upon the appearance of the boundary code and the presence or absence of a judging signal will cause the selection of instructional information to effect the desired computation involving the two sets of decimal numbers.

This invention relates to a register controlling system and more specifically to a novel and improved register system that is particularly useful in electronic computers.

In conventional arithmetic computers of the type wherein the numerical information is represented by binary coded decimal numbers, the computer is arranged so that the maximum number of digits of the first and second operand registers determine the maximum number of digits which can be handled by the computer.

When a multiplication operation is performed by the method as described above, there is an inherent disadvantage in that the number of digits of a product is necessarily restricted to the range of said normal digits and the higher significant digits of both the multiplicand and the multiplier registers are wasted. More specifically, let it be assumed that the number of normal digits in a register is $a$. If the number of digits of the multiplicand is $m$ and the number of digits of the multiplier is $n$, then $m+n\leqq a$. Even in the case of a maximum condition wherein $m+n=a$, if both the multiplicand and multiplier registers each have provision for a total number of normal digits $a$, the wasted digits in the multiplicand register are $a-m$ and the number of wasted digits in the multiplier register are $a-n$. The number of the wasted digits is in fact $a$ as may be represented by the following equation:

$$(a-m)+(a-n)=2a-(m+n)=a$$

From the foregoing, it is evident that, even though there are a total of $2a$ digits in the multiplicand and multiplier registers, only $a$ digits or one-half of the total number of digits in both registers is effective with the result that one-half of the digits are wasted.

This invention overcomes the aforementioned disadvantages of known systems and provides a novel and improved register control system wherein both the multiplicand and multiplier are contained in a single register and provides improved means for dividing the register so that the two sets of digits can be identified and utilized to perform different controls in accordance with their respective assignments. More specifically, this invention contemplates a novel and improved register control system wherein numerical information of different types can be introduced into a single register with a boundary code being introduced at the proper digit or bit position to represent the boarder between different sets of numbers each of which may include one or more digits. In addition, a control instruction selection circuit operated by a judging signal determines the presence or absence of the boundary code so that control instructions can be applied selectively to the numerical values contained within the register.

The above and other objects of the invention will become more apparent from the following description and accompanying drawings forming part of this application.

in the drawings:

FIGURE 1*a* is a diagrammatic illustration of a prior art register.

FIGURE 1*b* is a diagrammatic illustration of an improved register in accordance with the invention.

Figures 1A, 1B, 2, 3:
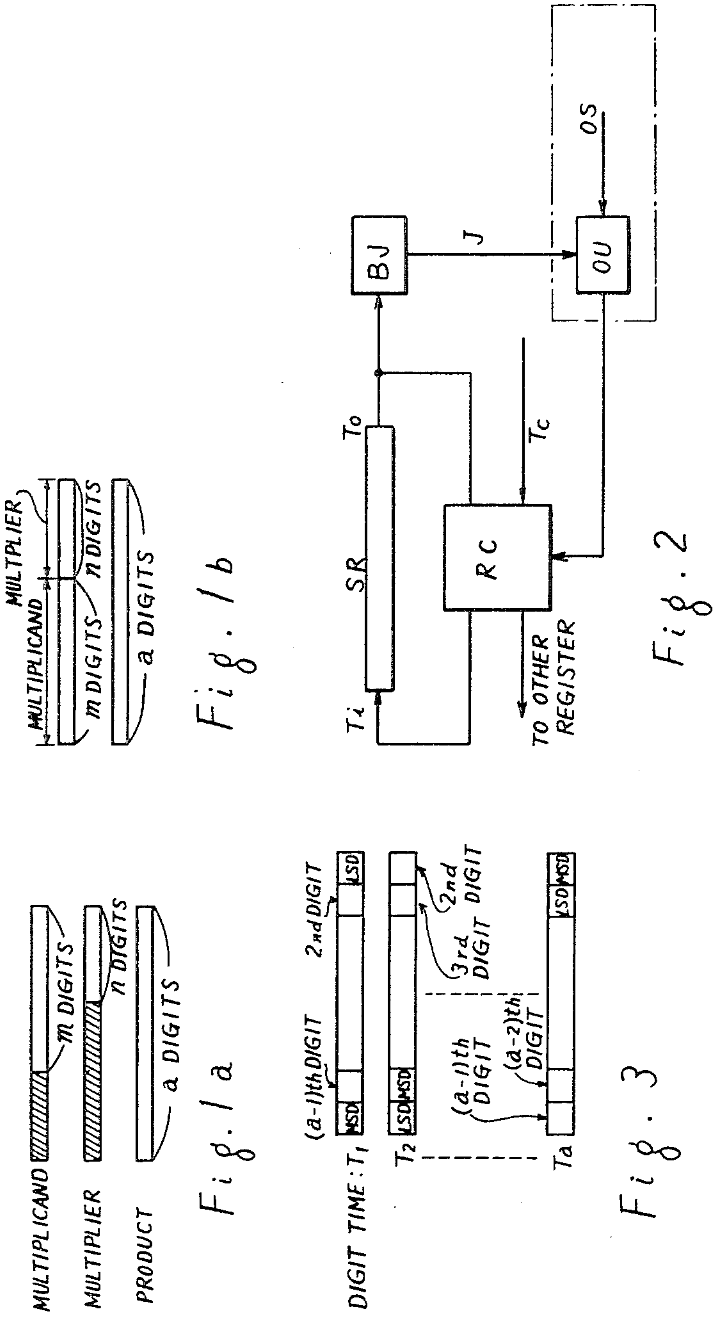
FIGURE 2 is a block diagram of a register controlling system in accordance with the invention.
FIGURE 3 is a diagrammatic illustration of the operation of a register in accordance with the invention.

Referring to FIGURE 1*a* illustrating a known register system, it will be observed that it comprises three registers, one of which contains the multiplicand, the second the multiplier, and the third the product. If each register has a total number of $a$ digits, then it is evident that the multiplicand and multiplier must each have a number of digits less than $a$ digits with the result that the entire multiplicand and multiplier register cannot be used. With the register in accordance with the invention as shown in FIGURE 1*b*, a single register is utilized for the multiplicand and multiplier and is divided to accommodate both numerical values. In this way, effective use is made of the entire register thus simplifying the register control system. This improved system is illustrated in block form in FIGURE 2.

Referring now to FIGURE 2, the register, or more specifically the shift register, is denoted by the letters SR and this register is controlled in such a manner that it may receive and store information pertaining to at least two numerical values each including one or more digits. The output $T_0$ of the register SR is connected through a register control RC to the input of the shift register $T_i$. In this way, the contents of the register are constantly circulated by a shift signal fed to the register control. The digits are circulated at a predetermined rate with each digit time being considered as one cycle. More specifically, let it be assumed that the number of digits in the register SR is $a$ and the digit times are indicated by the digit signals $T_1$, $T_2$ . . . $T_a$ which are supplied from a digit time control not shown. Then, the mutual relationship between the digits appearing at the output of the register at each digit time will be in accordance with the illustration shown in FIGURE 3. In this figure, MSD represents the most significant digit, while LSD represents the least significant digit.

Figure 4:
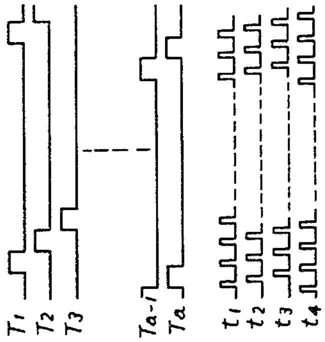
FIGURE 4 is a graph showing the relationship of each digit time to the bit times.

Inasmuch as each digit is represented by a binary code of four places or bits, then the number of all of the bits in the shift register SR is $4a$ and the contents will circulate at a cyclic rate equal to $4a$ times the time for each bit. The time for each digit which consists of four bits is counted by a bit counter not shown and as indicated by bit time signals ($t_1$–$t_4$). The mutual relationship between the digit time signals ($T_1$–$T_a$) and the bit time signals ($t_1$–$t_4$) is shown in FIGURE 4.

With the invention as described above information appearing at the output $T_0$ of the shift register SR during each digit time (four bit times) represents a specific numeral, namely, 0 to 9. The binary values would therefore be 0000 to 1001. However, with a four bit binary code, six additional numerals can be represented since the total number of combinations that can be obtained with a four place binary code is sixteen. Thus, the additional decimal values 10 through 15 represented by binary values from 1010 to 1111 are discarded as unnecessary codes.

In accordance with the present invention, one of the binary codes representing decimal values from 10 to 15 is employed as a boundary code to indicate the border between the two numerical values registered in the single register. For present purposes, the binary code 1111 will be utilized as the boundary code and the establishment of this boundary code is accomplished in a manner similar to that of the ordinary numeral or digit code. The boundary code is fed into the register upon the receipt of a control signal from an input buffer. The input terminal for code signals, such as the numerical value code and the boundary code, is represented by the arrow $T_c$ as shown in FIGURE 2.

Figure 5:
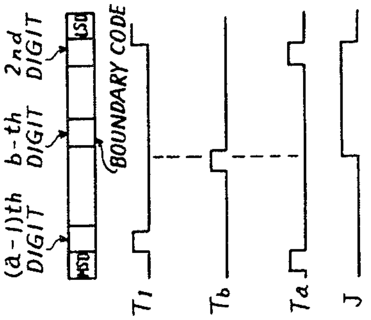
FIGURE 5 is a diagrammatic view of the register in accordance with the invention and the corresponding waveforms in various portions of the register.

When the boundary code is mixed with the numerical value codes and when the former is established as a border to divide the shift register SR into two portions, a boundary code judging circuit BJ as shown in FIGURE 2 is utilized. The judging circuit BJ functions to produce a judging signal output J when the contents of the codes appearing in the output $T_o$ of the shift register during the period of each digit time (four bit times) is the boundary code. The signal J is continuously generated until the end of $T_a t_4$ of the shift time. Since the binary value of the decimal 15 is utilized as the boundary code, then if all of the output signals from the register during the bit times $t_1$ to $t_4$ are each 1, that code is determined as the binary code. The judge signal is not generated, so that $J=0$, during the period beginning at $T_1 t_1$ of the shift time until the time of completion of the digit at which the boundary code appears at the output $T_o$ of the shift register SR. When the boundary code is present at the *b*th digit counted from the least significant digit, the time of such completion is $T_b t_4$ whereupon the judge signal appears ($J=1$) during the period from the beginning $T_{b+1} t_1$ of the next digit time to the end of the shift time. The mutual time relationship of these signals is shown in FIGURE 5.

A control instruction or control instruction group which may be required to effect performance of a specific type of control at a given time is normally applied as a so-called proper control signal to each register and related control circuit of the arithmetic unit. It is to be understood that, while only one shift register is shown, a plurality of such shift registers would be utilized in a single arithmetic unit.

In accordance with the system of the present invention, the control instruction selection circuit OU is provided so that the control instruction signal or instruction group OS for the related control circuit of the shift register SR can be conrolled by the boundary code and a particular numerical value in the shift register can be selected by reason of the presence or absence of the judge signal J.

With the control instruction selection circuit OU, it is possible to provide different control signals for the utilization of the numerical values contained in the shift register and appearing at the output $T_o$. For instance, one type of control signal can be utilized during the period $J=0$ while a different control signal can be utilized during the period $J=1$. Furthermore, the control signals which are not constant are determined by the boundary code which is inserted into the shift register in a proper digit position to separate the two sets of information in the control register. The selection of the particular judge signal to be provided at a given time may also be utilized for other registers or calculators in addition to the shift register SR and the boundary code for performing more complicated divisional operations. By way of example, let it be assumed that X is one numerical value and Y is another numerical value separated from X by a boundary code and X and Y and the boundary code are inserted into the shift register SR and let it further be assumed that the numerical value Y is to be shifted to the right by one digit and X is to be transferred to another register. The control system shown in FIGURE 6 can accomplish this end irrespective of the number of digits forming the numerical values X and Y, and this example indicates the high degree of usefulness of the invention.

Figure 6:
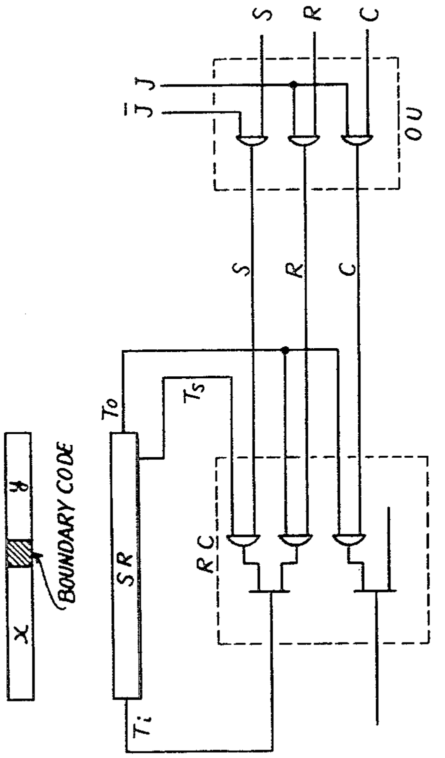
FIGURE 6 is a block diagram of the register illustrated in FIGURE 2 and one embodiment of associated circuitry for the operation of the register in accordance with the invention.

In FIGURE 6, S is a rightward shift control signal, R is a circulation signal, C is a transfer or addition signal and $T_s$ is the register output advanced by one digit. Thus, it is evident that any desired type of control can be effected depending on the combinations of signals fed to the control instruction selection circuit OU which in turn controls the register control RC.

The requirement for a boundary signal to separate the two numerical values in the shift register SR necessarily decreases the digit capacity of the register by one digit. However, in the case of registers in general, it is important to provide a parity check to determine whether all the information desired is in the register or whether the register has been affected in such a way to interfere with one or more of the bit signals in the register. With this invention, the boundary signal is also utilized to perform the parity check and thus only one digit is required to perform two operations.

More specifically, since there were six binary numbers represented by the binary codes 1010 to 1111, if a binary number is used as the boundary code wherein the upper two bits are each 1, then the four codes available for discriminating judgment of the boundary are 1100, 1101, 1110 and 1111. It is therefore evident that the lower two bits can be effectively utilized for a parity check or other uses.

While the foregoing description has been essentially directed to the case of a binary code register controlling system, it is to be understood that the present invention would also be applicable to apparatus utilizing other types of coded decimal numbers.

What is claimed is:

1. A register and control system therefor comprising at least one register having an input terminal, an output terminal and a plurality of elements for storing a plurality of binary coded decimal numbers, means connected to said input terminal for introducing at least two sets of binary coded decimal numbers each consisting of at least one digit, means connected to said input terminal introducing a boundary marker between said sets of numbers, means connected to the output terminal for removing said stored information and boundary marker, detecting means connected to said output terminal and producing a judging signal upon the appearance of said boundary marker as said decimal numbers are fed out of said register, control selecting means connected to said detecting means and responsive to the presence and absence of a judging signal and producing selected control information in response thereto and a register control interconnected with said register and said control selecting means to effect computations involving said decimal numbers in accordance with said selected control information.

2. A register control system according to claim 1 wherein each of said decimal numbers is represented by four coded binary bits.

3. A register control system according to claim 2 wherein said boundary marker consists of four coded binary bits differing from the sets of coded binary bits utilized for representing the decimal numbers.

4. A register control according to claim 3 wherein the production of said judging signal upon appearance of the boundary marker at said output terminal is determined by the decimal number next preceding said boundary code when the last said decimal number is in the least significant digit position of said register.

5. A register control according to claim 3 wherein said boundary code includes a parity check code.

6. A register control according to claim 3 wherein said register control is connected between the input and output terminals of said register and circulates the decimal numbers and boundary marker through said register and the production of said judging signal is determined by the decimal number next preceding said boundary code when the last decimal number is in the least significant digit position of said register.

7. A register control according to claim 5 wherein the upper two bits of said binary boundary code are each represented by the numeral 1 and the other two bits of said boundary code are utilized as the parity check code.

References Cited

UNITED STATES PATENTS

| | | | |
|---|---|---|---|
| 2,968,792 | 1/1961 | Adams | 340—172.5 |
| 3,064,080 | 11/1962 | Rea et al. | 340—146.1 X |

MALCOLM A. MORRISON, Primary Examiner

CHARLES E. ATKINSON, Assistant Examiner

U.S. Cl. X.R.

235—165; 340—172.5